United States Patent [19]

Shen

[11] Patent Number: 4,475,104

[45] Date of Patent: Oct. 2, 1984

[54] THREE-DIMENSIONAL DISPLAY SYSTEM

[75] Inventor: Tsu Y. Shen, Andover, Mass.

[73] Assignee: Lexidata Corporation, Billerica, Mass.

[21] Appl. No.: 458,362

[22] Filed: Jan. 17, 1983

[51] Int. Cl.³ ............................................. G09G 1/02
[52] U.S. Cl. ................................. 340/729; 340/723; 340/747; 340/703; 364/521
[58] Field of Search .............. 340/747, 728, 729, 739, 340/741, 723, 717, 742, 703; 364/521, 522

[56] References Cited

U.S. PATENT DOCUMENTS

| | | | |
|---|---|---|---|
| 3,621,214 | 11/1971 | Romney et al. | 235/151 |
| 3,736,564 | 5/1973 | Watkins | 340/172.5 |
| 3,899,662 | 8/1975 | Kreeger et al. | 235/151 |
| 3,944,997 | 3/1976 | Swallow | 340/717 |
| 4,056,713 | 11/1977 | Quinn | 340/742 |
| 4,107,780 | 8/1978 | Grimsdale et al. | 364/521 |
| 4,121,283 | 10/1978 | Walker | 364/200 |
| 4,127,849 | 11/1978 | Okor | 340/729 |
| 4,156,237 | 5/1979 | Okada et al. | 340/729 |
| 4,165,506 | 8/1979 | Brands et al. | 340/706 |
| 4,222,048 | 9/1980 | Johnson | 340/747 |
| 4,238,826 | 12/1980 | Jones, Jr. | 364/515 |
| 4,254,467 | 3/1981 | Davis et al. | 364/521 |
| 4,303,986 | 12/1981 | Lans | 364/900 |
| 4,412,296 | 10/1983 | Taylor | 340/729 |
| 4,439,761 | 3/1984 | Fleming et al. | 340/748 |

Primary Examiner—Gerald L. Brigance
Attorney, Agent, or Firm—Robert F. O'Connell

[57] ABSTRACT

A display system for displaying a three-dimensional image on a two-dimensional raster display screen wherein a host processor supplies input information on the geometric elements, e.g. polygons, which make up the image to a local display processor which processor said input information and provides data concerning the location, color, intensity and depth of the points which make up the surfaces of the polygon. The depth data is stored in a depth buffer which is a part of the display processor and the color and intensity data is also stored directly in a frame buffer or as color index data in the frame buffer which is used to address the desired color and intensity stored in a color look-up table. The color and intensity video data is supplied to a suitable display means, such as a cathode ray tube.

36 Claims, 10 Drawing Figures

THREE-DIMENSIONAL DISPLAY SYSTEM

INTRODUCTION

This invention relates generally to systems for displaying three-dimensional shaded images on a two-dimensional raster display screen and, more particularly, to an improved system for permitting the display to be built up incrementally in any selected order of locations on said screen and for a complete image in a time period substantially less than that required for displaying a complete image in presently known systems of this general type.

BACKGROUND OF THE INVENTION

In providing three-dimensional representations of images on a two-dimensional display means, such as a raster display screen of a cathode ray tube, for example, it is necessary to provide mechanisms for eliminating hidden surfaces and for shading visible surfaces in the image so that a general three-dimensional representational effect will be provided. In conventional display systems for producing such an effect, each point on the overall image to be displayed is created at a first processor (normally referred to as a "host" processor) but the data representing each such point is not supplied for display on the raster display screen until every point forming the overall image has been created and the data defining such complete image has been formed and stored at the host processor. The data is then supplied to a second processor (normally referred to as a local "display" processor) which is associated with the raster display means and which converts the overall point data into video data for providing a line-by-line scan display of the image to be represented.

In such systems the host processor normally performs a number of functions. The host processor provides for "viewing transformation", that is, the transforming of input information received from a data base and representing the geometry of the image to be displayed into data which provides for an appropriate scaling of the image or for a rotational movement of the image, or for an enlargement of different regions of the image. The host processor further provides for a "volume clipping" operation, i.e., determining a selected region of an overall image which is required to be displayed, a process sometimes referred to as "windowing".

Although many approaches have been used in the art to provide three-dimensional displays and which use various techniques for solving "hidden surface" and "shading"problems, one known approach has been to use a depth buffer, sometimes referred to as a Z-buffer in the system.

In such a system the host processor provides suitable information for permitting "hidden surface" or "hidden line" removal, i.e., data which defines the depth relationships among the points which form the image so that points on one portion of the image which are behind points on other portions of the image at the same display location in the overall visual representation are effectively removed, i.e. not used, in the displayed image. Such depth information is normally stored in the host processor as an array of data points in a suitable portion (The depth buffer portion) of the processor memory.

The host computer also performs the function of shading visible surfaces of the image, i.e., it creates suitable intensity values for each visible point on the overall image so as to provide a three-dimensional shading effect in the image display.

The host processor further provides for "scan conversion" or "rasterization" of the data so that the data is translated into the necessary data for making up the image needed at the display means in terms of the color and intensity, as well as the locations, of all of the points which form the image. Such data is then supplied from the host processor to the display processor for display on a cathode tube screen, for example, on a line-by-line basis.

When a depth, or Z, buffer approach is used, the hidden surface removal problem is solved at the host processor by the use of suitable algorithm, sometimes referred to as a depth buffer or Z-buffer algorithm, which processes the input data and stores the necessary depth relationship information required to determine each visible point of the three-dimensional image, such processed depth information being stored in the depth buffer portion of memory. Data defining the location, color and intensity of each point of the image to be displayed is stored in a suitable storage means which can be referred to as the "image" buffer portion of memory. Once all of the data required to define the image is so stored, the image information can then be transferred to a local display processor where it is placed into a conventional frame buffer means so that the image is then displayed on the raster display screen on a line-by-line basis.

A major disadvantage of such an approach is that the entire image must be created and stored at the host processor before any data concerning the points which define the image can be supplied to the display processor. It is entirely impractical in such a system to attempt to transfer such information from the host processor to the display processor incrementally as image data for each point is created. The overall time for such a process would be too long for any practical advantage to be obtained from such a process. Accordingly, no matter what hidden surface, or depth buffer, algorithm is used by the host processor to provide the desired depth relationship data, the need for storing all the image information at the host processor permits the image to be displayed only when all such information is created and made available at the host. Normally, then, the most effective way to display the information is on a conventional line-by-line basis from top to bottom of a display screen.

Accordingly, once the user wishes to use the information in the data base to display an image, the user must wait for data defining the complete image to be duplicated in a non-displayable form at the host processor before it can be transferred to the display processor and the image begins to appear on the display screen. Moreover, when a change is made in the image by the user, the change must be created at the appropriate locations by the host processor and the entire image must be re-displayed on a scanned line-by-line basis before the revised image can be seen by the user. Nor can an overall image comprising several distinct objects be presented to the user on the display screen on an object by object basis.

Such a system effectively acts in the nature of a raster plotting device rather than a random access display device and requires a relatively long waiting time from the time a request for an image display is made and the time the first line of the image can even begin to be displayed on the screen. Once such display begins, the host processor must supply every data point from the image buffer at the host processor to the frame buffer of the display processor, a significant burden.

In order to improve the operation of such a systenm, it is desirable to devise a system which avoids the relatively long waiting time required before a user-requested image can be created and displayed. It is further desirable for such an improved system to permit a change at any location of the image without requiring the host processor to re-calculate the entire image that is going to be displayed before such change can be seen at the display screen.

Moreover, it is desirable for a system to permit a "build-up" of the overall image so that various locations of the image can be displayed independently of other locations thereof and the display of the overall image can be continuously built up in any selected order of its component parts or objects. The build up of an overall image in a selected order can be generally referred to as an incremental construction of the overall image.

SUMMARY OF THE INVENTION

In accordance with the invention, a display system is arranged so that the processing of user-supplied input informatiion defining a three-dimensional image, which input information is required to produce both intensity and color data and depth relationship data for the image, is performed not at the host processor but at the local display processor. Accordingly, the display processor, rather than the host processor, is used to create image data defining the location, color and intensity of each point of the overall image. The display processor also processes and stores depth data which defines the corresponding depth relationships of the image points at each location of the overall image such data being stored in a depth buffer means which also forms a part of the local display processor. Image data representing the image color and intensity can be stored directly in a frame buffer means which is part of the display processor and then supplied as video data to the display or, alternatively, color index data representing such image information can be stored in the frame buffer and used to address a color look-up-table to obtain the color and intensity information which is then supplied therefrom as video data to the display. Because both image information and the depth information are immediately available for use by the local display processor, video image data defining each point of the overall image can be immediately supplied for display at the display means as soon as it has been created and the overall image can be continuously "built up" on a display screen for immediate viewing by the user.

The host processor in such system is used to perform geometry transformation functions, as discussed above, but need not be used in order to create all the data for duplicating an entire image at the host processor before any portion of the image is available for display. The host processor is then available for other purposes by the user. Because the functions of hidden surface removal, visible surface shading, scan conversion and point display drawing are performed by the display processor, the overall image to be displayed is constructed incrementally and selected portions thereof can be displayed immediately at any location and in any order (i.e. a random access display system).

The user sees the image as it is being constructed without waiting for the complete image to be processed before it can begin to be displayed, as on a line-by-line basis. Such a display system is then more responsive to the user than previously available systems and avoids the time consuming and tedious process of displaying the three-dimensional image, with its hidden surface removal and shading problems, on a line-by-line basis, often a source of great annoyance to a user. Other advantages of such a system in accordance with the invention, such as its ability to incrementally construct the overall image on a object-by-object basis, its ability to make relatively rapid corrections to portions of the image, and its ability to create realistic three-dimensional shading of the image at the local display processer, will become apparent as a more specific description thereof is supplied below.

DESCRIPTION OF THE INVENTION

The system of the invention can be described in more detail with the help of the drawings wherein.

Figure 1:
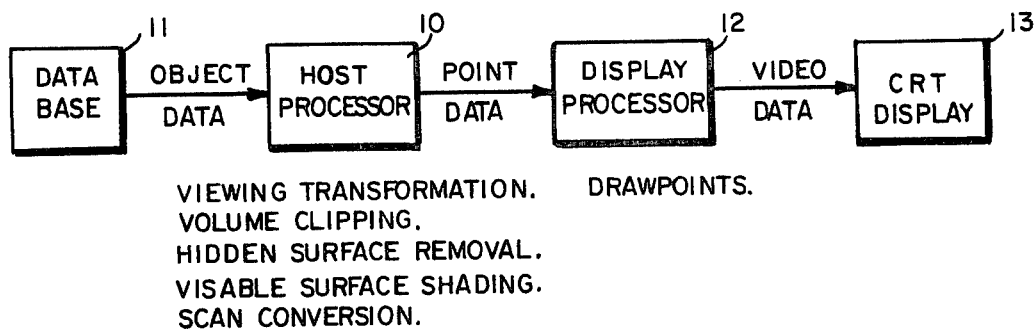
FIG. 1 shows a block diagram of a conventional system known to the prior art.
Figure 1A:
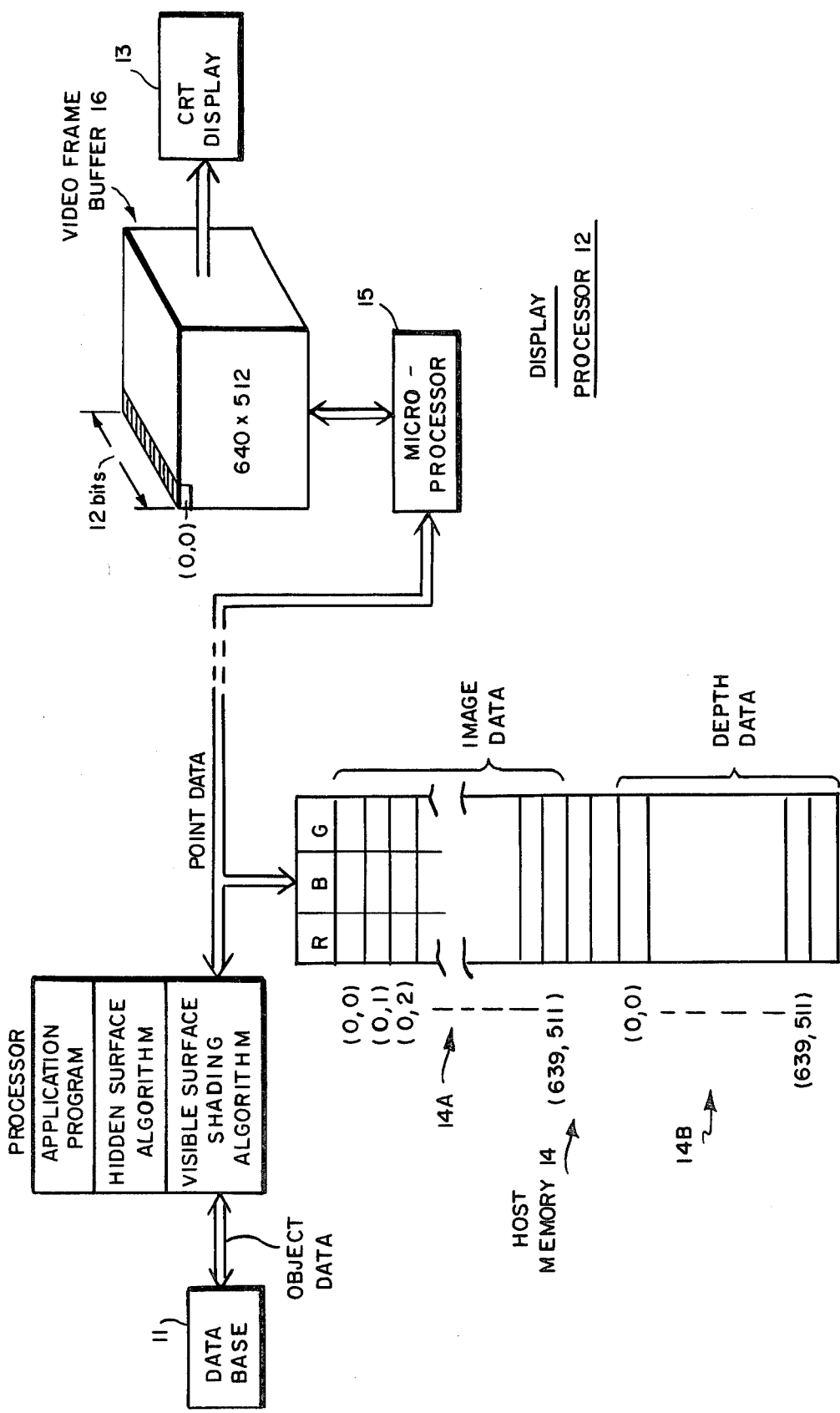
FIG. 1A shows a more detailed representation of the system shown in FIG. 1.

As can be seen in the diagrams of FIGS. 1 and 1A, an approach used by prior art systems for providing a display of three-dimensional graphics information on a two-dimensional display screen utilizes a host processor 10 which receives object data, i.e., data from a suitable data base 11 which defines an overall image which is to be displayed in a three-dimensional image form on a cathode ray tube raster display screen 13. The host processor may include, for example, any well-known processor (e.g., a Model VAX 780 computer made and sold by Digital Equipment Corporation of Maynard, Mass., or a Model 68000 microprocessor made and sold by Motorola Company of Phoenix, Ariz.) and further includes host memory 14 for storing image data concerning the location, color and intensity of each point which makes up the overall image which is to be displayed, i.e. a non-displayable image buffer memory portion 14A. Such non-displayable image buffer portion of memory 14 effectively stores sequential data defining the intensity and color of each of an array of data points of the overall image, as shown in FIG. 1A.

Further, the host processor memory 14 normally includes a suitable depth buffer memory portion 14B which stores depth data defining the depth relationships of the array of points which form the overall image. For example, if two or more portions of an overall image overlap, certain locations on the image have one or more points in common and at each such common location a decision must be made as to which portion is in front of one or more other portions so that common points on the latter portions are "removed" or "hidden," i.e., they are not shown in the final displayed image. Any suitable algorithm can be used by the host processor for such purpose, one such algorithm being described, for example, in the text *Principles of Interactive Computer Grahics*, William M. Newman and Robert F. Sproull, McGraw-Hill Publishing Co., Second Ed., 1979, Chapt. 24, "Hidden Surface Elimination", Pages 369 et seq.

Accordingly, a non-displayed duplicate of the overall data which is required to create the desired image display on the cathode ray tube raster screen is formed and maintained at the host computer memory 14 in a fully completed form prior to the transfer of such data to the local display processor 12. Once the input data has been so processed to form point data which is stored in the image and depth buffer portions of memory 14, the stored image data is transferred to the display processor, the microprocessor 15 of which merely converts such data into video signals via a video frame buffer 16 which supplies such video data to a display, such as a cathode ray tube display 13, so as to draw each point on the raster screen thereof.

As can be seen in FIG. 1, the functions performed by the host processor and the display processor are indicated below each processor block. The only function performed by the local display processor is to provide the video data displaying each of the points in the scanning process once the point data has been completely obtained from the host processor.

Figure 2:
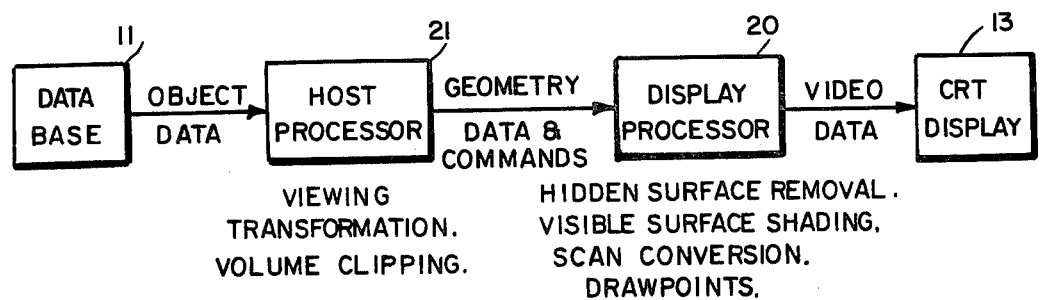
FIG. 2 shows a block diagram of a system in accordance with the invention.
Figure 2A:
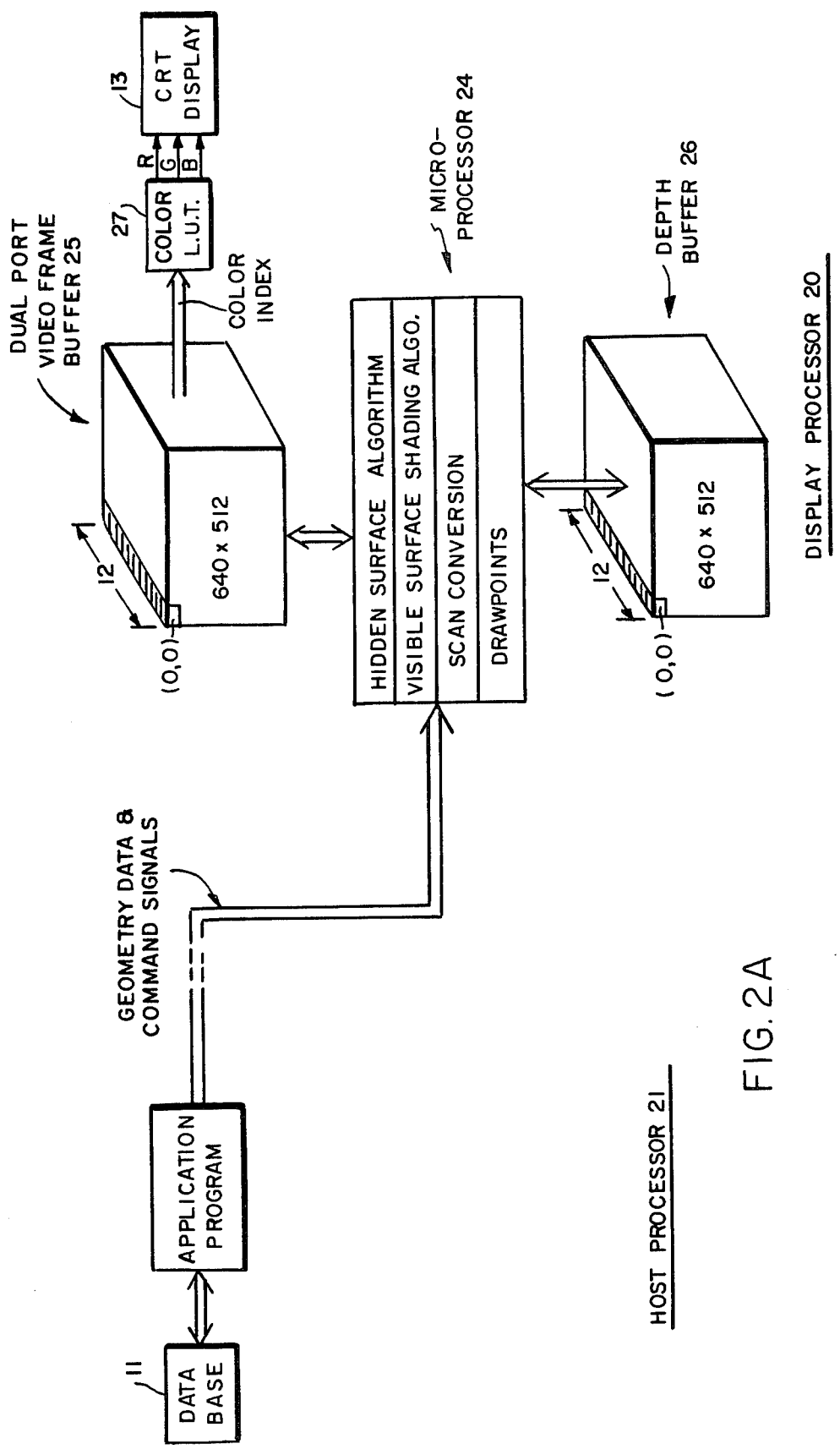
FIG. 2A shows a more detailed representation of the system shown in FIG. 2.

FIGS. 2 and 2A show the novel approach of one embodiment of the invention wherein the local display processor 20 is arranged to provide the functions of hidden surface removal, visible surface shading and scan conversion as well as the function of providing video data for displaying the image points on the cathode ray tube display screen. By providing local processing of image and depth buffer data at the display processor 20 rather than at a host processor 21, the two most time consuming tasks for generating a shaded three dimensional image can be overlapped. Thus, the host processor 21 performs the geometry transformation operation and, if necessary, a volume clipping operation, such operations being performed concurrently with the point data processing operation which is performed by the display processor. There is no need to duplicate the entire display image at the host processor.

The host processor then supplies appropriate command signals to the display processor, as discussed in more detail below, in response to which the display processor performs the necessary operations for creating the displayed image on the CRT display 13.

Thus, for example, input data defining the vertices of a geometric element, e.g. a polygon, which forms a part of the overall image to be displayed can be suppled by the host processor 21. As the host processor provides data concerning the vertices of such polygon to the local display processor 20, it is suitablty processed, as discussed below, for example, to provide intensity and color video data to the CRT display via a video frame buffer 25 and a color look-up-table 27 in the particular embodiment being described herein. The display processor also processes depth data for supply to a depth, or Z, buffer 26, also located at the local processor 20. As the input data is so processed, the visible portions of the polygon can be immediately displayed on the raster screen of the CRT. As data concerning each subsequent polygon is transferred from the host processor to the local display processor, the visible portions of each polygon are immediately displayed and the overall image is incrementally built up. Such a process not only eliminates the user's anxiety while waiting for a display of some kind to appear on the screen but also allows separate objects in the overall image to be constructed instead of constructing the entire image on a line-by-line basis.

In the particular embodiment shown, for example, processing of the input data in response to commands form the host processor can be arranged to provide color index data with respect to the color and intensity of each point of the image for storage in the video frame buffer 25. Such index acts as a "pointer" to a specified location (address) in a color look-up-table corresponding to such index which then provides the required video color (red-green-blue) data to the CRT for display. Alternatively, data directly specifying the color for each image point can be stored in the frame buffer 25 and such color data can be supplied directly to the CRT from the frame buffer.

Figure 3:
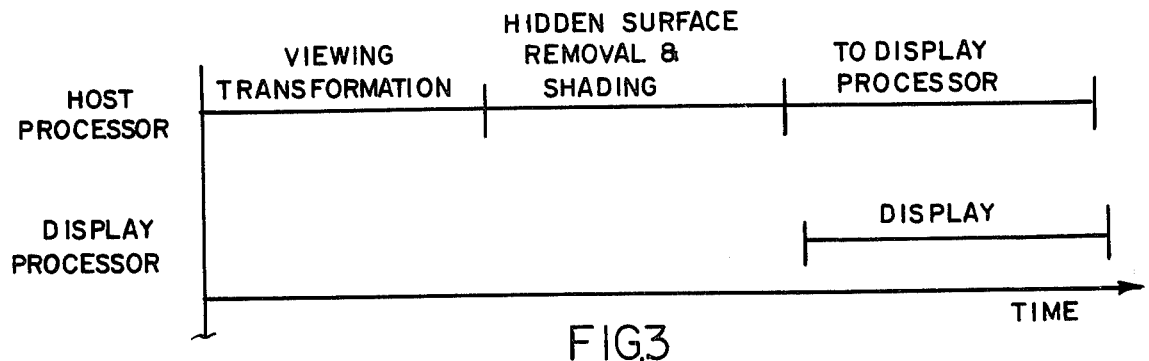
FIGS. 3 and 4 show graphical representations of a comparison of the relative time periods in which display occurs using the conventional approach of FIG. 1 and the approach of the invention in FIG. 2, respectively.
Figure 4:
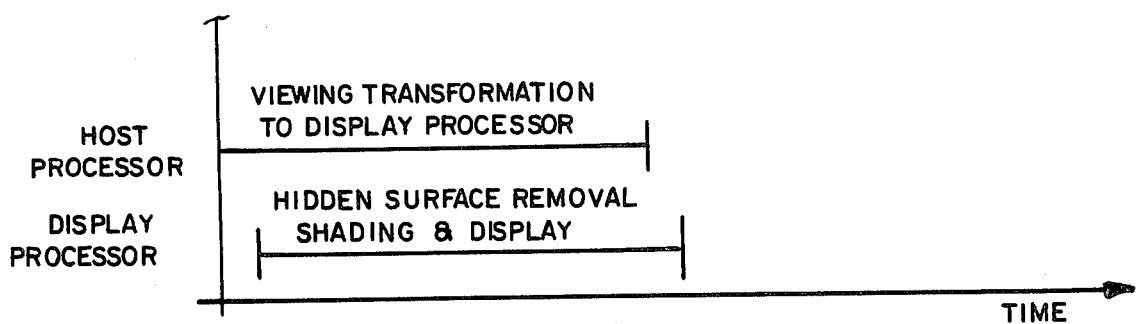

FIGS. 3 and 4 show a graphical comparison of the time periods involved in utilizing the approach of the system of FIGS. 2 and 2A as compared with that of the system of FIGS. 1 and 1A. As can be seen in FIG. 3, in previously known systems using Z buffers, the host processor must perform the viewing transformation (and volume clipping operation, if necessary) initially before it performs any hidden surface removal process (using a depth buffer algorithm) or any shading operation. The host processor conventionally stores all of the data which results before transferring any data concerning the complete image to the display processor which can then display the overall image on the display screen using a conventional line-by-line raster scanning operation.

In contrast, as shown in FIG. 4, the host processor of the system shown in FIGS. 2 and 2A performs only the viewing transformation (and volume clipping) operations on the input data and transfers such data, e.g. describing a geometric element such as a polygon, immediately to the local display processor which then performs the appropriate algorithms in response to host processor commands for producing the image and depth data for each element. The display processor can then immediately display the visible surfaces of each polygon, for example, on the screen as it is processed and while the host processor is processing subsequent polygons in the overall image. Such simultaneous host processor and display processor operations proceed until the entire image which is to be displayed has been built up on an element by element (polygon by polygon), i.e., an incremental, basis. Geometric elements other than polygons which can be so processed, for example, are three-dimensional points, lines or other surfaces. The overall time, as can be seen in FIG. 4, is reduced considerably from the time required using the system of FIGS. 1 and 1A. There is no extensive waiting time before a user can see any part of the image since the image is being continuously built up substantially from the beginning when the initial geometric element is processed and displayed.

As can be seen in the more specific block diagram of FIG. 2A, the microprocessor 24, which operates in combination with the video frame buffer means 25 and the depth buffer means 26, can be of any well-known type, such as the Model Z-8000 microprocessor made and sold by Zilog Company, Cupertino, Calif., and can be appropriately programmed, in accordance with the particular processor language associated with the processor model selected, to perform various algorithms for processing the data supplied from the host processor. One such algorithm provides information relating to the location, color and intensity of each point which makes up the overall image for storage in the frame buffer means 25 directly as an array of image color/intensity data or as an array of color indices for selecting the required color and intensity from a color look-up-table. A suitable algorithm for such operation which would be well known to the art as discussed, for example, can be found in the above referenced text of Newman and Sproull at page 398 et seq. Another algorithm provides information defining the depth relationships of points at common locations on the overall image (i.e., the hidden surface information which provides the three-dimensional effect as discussed above) for storage as an array of depth data in the depth buffer means 26.

Shading can be obtained by linearly interpolating data between two points supplied by host processor, as discussed in more detail below, which linearly interpolated data can then be supplied as appropriate color indices for the intervening points to the display means 13 via color-look-up table 27. The latter table must be pre-loaded by the user in accordance with the user's desired color display, the table responding to the image color index data from frame buffer 25 to provide the appropriate combination of red, green and blue information to display the geometric element involved on a cathode ray tube display screen. Control of whether a particular point is actually displayed is determined by the "depth" information stored in depth buffer 26 since processed points which are defined as "hidden" will not be displayed on the screen of display means 13.

The microprocessor provides the timing for producing, in a particular embodiment, for example, a 640×512 image resolution for the image and depth buffers, as shown in FIG. 2A, at a 30 Hz frame rate, for example. The buffers can be well-known memory modules using standard chips, such as the Model 4116 dynamic memory made and sold by Motorola Company, Phoenix, Arizona, which can be used for each of the buffers. Such modules utilize 12 memory planes, for example, as shown in FIG. 2A. It is not necessary, however, to utilize the same memory module for each buffer and different module types can be used in accordance with the invention. The color look-up table 27 responds to a 12-bit input address signal, for example, from the image buffer, and provides 8-bit output signals per color channel, for example.

The color and shading of a particular point is determined by the 12-bit index value, for example, which is written into the frame buffer for each point to be displayed. This value is used as an address input to the color look-up-table 27 from the frame buffer to select from the table particular color and shades thereof at such address as pre-loaded by the user.

Depth (or "Z") values in depth buffer 26, are in the particular embodiment being described, for example, 12-bit unsigned integers with zero representing a "background" value, i.e., a value furthest from the viewer.

Each point with a depth, or Z, value larger than a previous Z value at the same location is considered as a visible point and the new Z value is stored into the depth buffer. Subsequent Z values are then compared with the current Z value to determine which points are visible on the displayed image.

Figure 5:
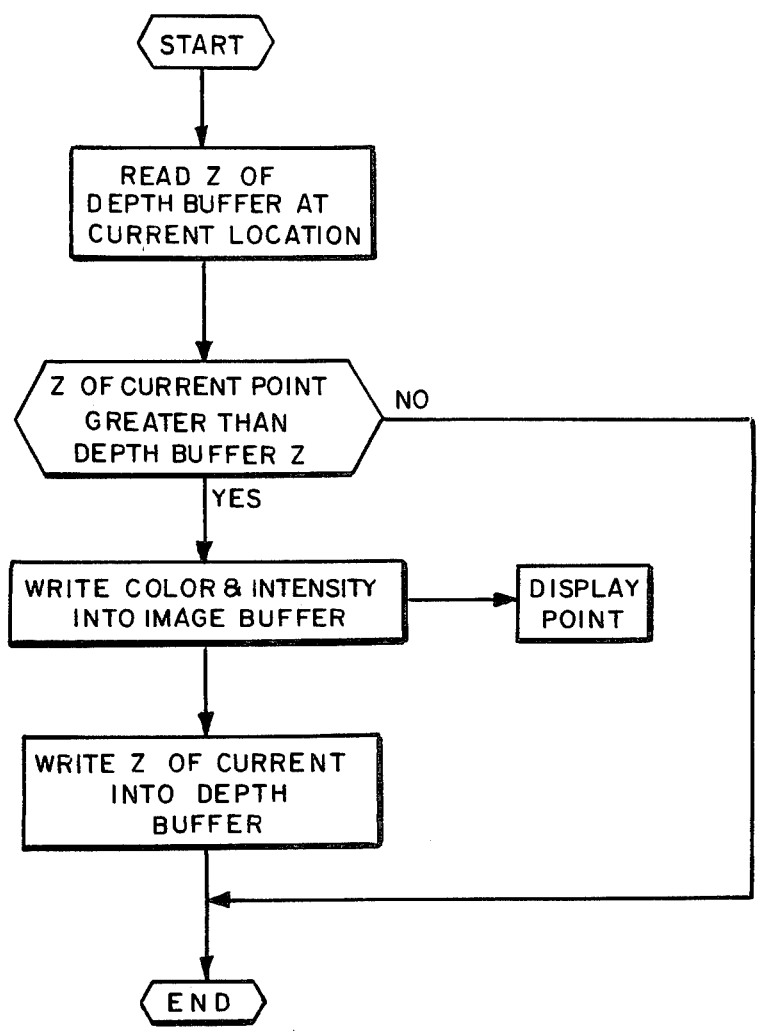
FIG. 5 shows a simplified flow chart for drawing a point of an overall image using conventional depth buffer techniques.

In providing for the display (i.e. the drawing) of each point of the image as it is processed by display processor 20 in the system of FIG. 2A, appropriate operations are performed by microprocessor 24 in accordance with the simplified flow chart depicted in FIG. 5. For illustrative purposes, such flow chart depicts the simplest operation involved where it is assumed that the point to be displayed is one in which no translucent effect is to be established in the displayed image, which does not involve any change to be made from an already established zero coordinate point for the image to be displayed, which does not involve the "sectioning" of the image to be displayed, and which is to be used to provide the desired three-dimensional effect (i.e., the point to be displayed is not merely used to provide a two-dimensional image effect). Under such conditions the contents of the depth buffer 26 at the location of the current point under consideration for display is read. The depth value of the current point is then compared with the previously stored depth value in the depth buffer at such location. If the current point is greater than the already stored value, then the current point is in front of the previously stored point in the image to be displayed. Such comparison then conditionally permits the desired color intensity value to be written into the image buffer 25, which value can be immediately transferred to the display means via the color look-up-table 27 for immediate display on the screen at the identified location with the desired color and intensity. At the same time the depth value of the current point is written into the depth buffer so that a subsequent point being processed at the same location by the image can be compared with it.

If the depth value of the current point under consideration is equal to or less than the previously stored depth value in the depth buffer at such location, the current point is not displayed.

Figure 6:
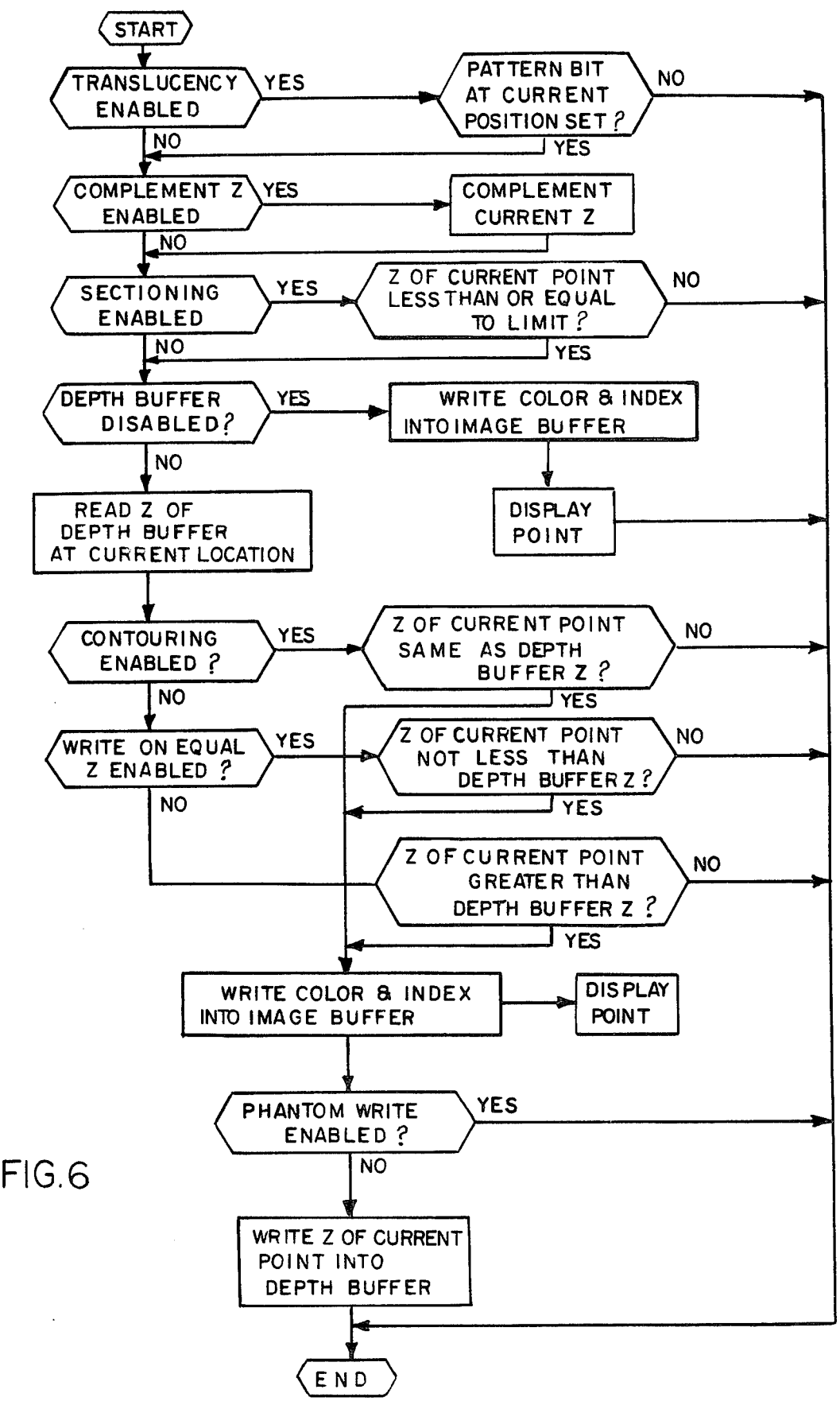
FIG. 6 shows a more complex flow chart for drawing each point of an overall image in accordance with the system of the invention.

The flow chart of FIG. 6 represents a more complicated operation for drawing a point of the displayed image which takes into consideration other conditions including those discussed above. As can be seen therein, before reading the depth buffer contents the translucency condition is first tested. Thus, if the user desires to provide a translucent image at the location of the current point under consideration, the translucency enablement (YES) overrides the reading of the depth buffer. Before drawing the point involved the translucency pattern, i.e. the degree or density of translucency must be set by the user and a determination as to whether such pattern has been set is made before proceeding with the process depicted in the flow chart. In accordance therewith the user may desire that a surface portion which normally would be hidden (all points in such portion would be eliminated and not be displayed) be made partially visible, such partial visibility providing a translucent effect in the image at the location of such portion. In such case the degree of translucency will be determined by the ratio of the number of points on such surface which are to be made visible to the number of points which are to be hidden. For example, the pattern may be such as to make half of the normally hidden points of such a surface portion visible and to make half of the points hidden. Accordingly, before proceeding with a decision to display or not display the points on such surface the processor must determine whether a translucency effect is to be established and, if so, must determine that the translucency pattern (the "degree" thereof) is set.

If the translucency pattern is so set, or if translucency is not to be enabled at all, the next condition examined is whether the currently established zero point for the coordinate system used for the image display is to be changed or not. Normally, the coordinate zero depth point is at the back plane of the image. However, in some cases the user may desire that the front plane of the image be used as the zero depth point (sometimes referred to as the complement depth). The processor accordingly determines whether the normal zero depth is to be used or whether the complement depth is to be enabled.

Once the zero depth point is defined, either by enabling the complement or using the conventional back plane zero depth, the next condition to be examined is whether the point currently being considered is in a portion of the image which represents a "sectioning" of the image. If sectioning is to occur ("Sectioning Enabled" is YES), the current point is examined to see if its depth value is less than or equal to the depth limit of the section being taken. If less than or equal to such limit, the current point is a candidate for display, while if it is not less than or equal to such limit, it is not displayed and examination thereof ends.

The next condition examined is whether a two-dimensional or a three-dimensional image is to be displayed. In the former case the depth buffer is simply disabled (YES) (since depth information has no significance) and the current point is written into the image buffer and can be immediately displayed on the display screen via the color look-up-table. If, on the other hand, a three-dimensional image is required, the depth buffer is not disabled (NO) and the contents thereof are read at the location of the current point under consideration, as discussed above, to determine whether the current point is a visible one or not.

At such stage, once the contents of the depth buffer at the current point are read, a determination is made as to whether the current point intersects with a previous point at the location involved and, if so, whether the current point should also be displayed together with the previous point so that the intensity at that location is accordingly emphasized ("contouring"). If both intensity points at an intersection are to be displayed (contouring enabled is YES) a determination must be made as to whether the current point is at the same depth as the previous point stored at such location in the depth buffer and, if it is not, further examination of the current point ends. If it is, the current point is then displayed via the color look-up-table.

If no "contouring" is required one further condition is examined to determine whether the current point under examination should be displayed if it is either equal to or greater than the depth of the point presently stored in the depth buffer at the location in question. If so (YES), the depth (Z) value of the point is compared with the depth buffer value and if it is not less than the latter the currently examined point is displayed. If it is less than the latter, no further examination of such point is made.

If the current point is to be displayed only when it is greater than the depth (Z) value of the depth buffer (a normal condition for most three-dimensional images), the value of the current point under examination is compared with the depth value previously stored in the depth buffer at the location in question and, if greater than the latter value, it is displayed via the color look-up-table. If not, examination of the current point ends and it is not displayed.

When the current point is displayed, a decision must further be made as to whether its depth value is to be stored in the depth buffer at the location involved. Since in some cases (as when a "cursor" point is being displayed) the current point may be displayed but its depth value is not stored in the depth buffer, in which case it is treated as a "phantom" point (effectively a temporarily displayed point only). If it is not to be treated as a phantom, or non-stored, point, its depth value is written into the depth buffer at the location in question.

Figure 7:
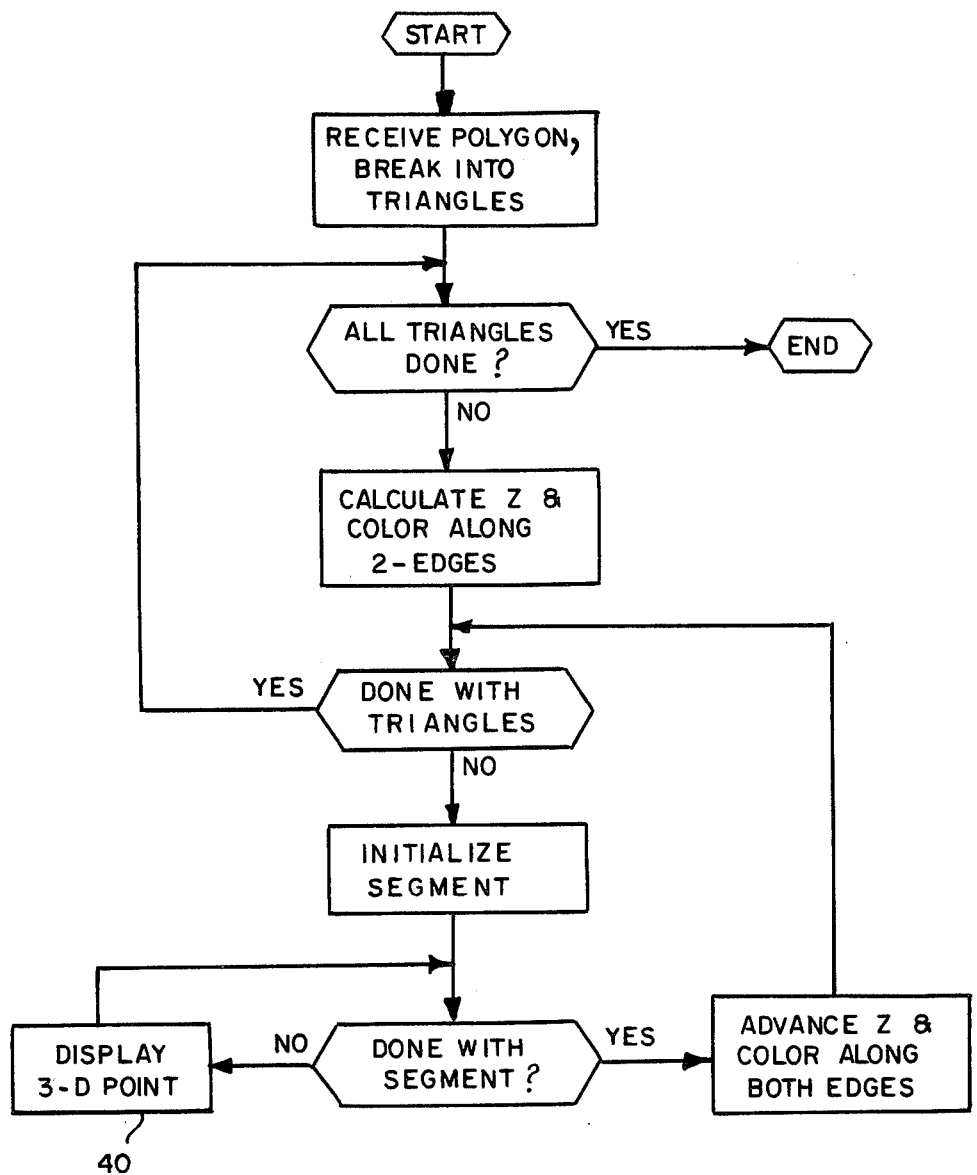
FIG. 7 shows an exemplary flow chart, useful in the system of the invention, for producing an image of a polygon which forms a part of an image to be displayed.
Figure 8:
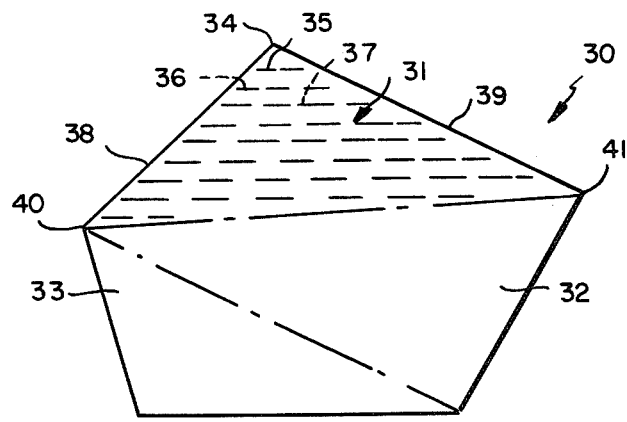
FIG. 8 shows a diagrammatic representation of an exemplary polygon formed in accordance with the process of FIG. 8.

An exemplary use of the procedure described above with reference to the flow charts of FIG. 5 or FIG. 6 is depicted in the flow chart of FIG. 7 for displaying a polygon in a three-dimensional representation. A convenient technique for drawing a polygon is to break the polygon into a plurality of separate triangles and to determine the image and depth values along parallel segments defined by the end points thereof along two sides of each triangle beginning at the top of the triangle and moving downward from segment to segment and from left to right along each segment. Such overall procedure is depicted for the pentagon 30 shown in FIG. 8, for example, wherein three triangles 31, 32 and 33 are defined as making up the pentagon. The location of points on triangle 31 is defined as including end points 34, 40 and 41, for example. The surface is defined by the points along successive segments 35, 36, 37, ... etc. from left (at the edge 38 of triangle 31) to right (at the edge 39 of triangle 31).

When the points on a segment are displayed (see block 40 of the flow chart in FIG. 7), the process is repeated for each successive segment until the display of the triangle, or that portion of the triangle which is visible in the three-dimensional representation involved, is completed. The same process is then repeated for the next triangle, and so on, until the overall polygon, or visible portion thereof, is completed.

In each case the display of each point (or non-display if the point is determined to be not visible on the overall three-dimensional image) which is performed in block 40 is performed using the flow chart depicted in FIG. 6 and described above.

In accordance with the particular embodiment being described, the host processor 21 supplies information defining the vertices of the triangle 31, i.e. the location and information for producing depth and color index data for each vertex. The microprocessor 24 determines the depth data therefor, using a suitable depth algorithm, as mentioned above, and also determines the color index values for points along the lines forming the sides of the triangle (lines 34–40, 34–41 and 40–41). The processor then uses a suitable algorithm to linearly interpolate the color index (shading) data for points on such lines between the end point, i.e. The end points of each segment 35, 36, 37 ... etc. One such linear interpolation algorithm is discussed in the Newman and Sproull text at page 398, referred to above.

The processor then performs the same linear interpolation for points between the end points of each segment using the same algorithm. Accordingly when such linear interpolations are completed the color indices for all of the points making up the triangle are determined and are stored in frame buffer 25 and the triangle can be displayed with the desired color and shading using the video data supplied from the color look-up table 27 in response to such color indices. Similar data can be generated for each triangle which makes up the polygon so that the local display processors can provide the three-dimensional image thereof with appropriate color and shading from the information on the vertices thereof supplied by the host processor.

As discussed above, the host processor 21 supplies suitable commands to the display processor to request that certain operations be performed with respect to the image which is to be displayed. Suitable commands (e.g. 16-bit command signals) which can be so supplied are described below. More specific information on such commands is set forth in Appendix A, such information being summarized in general below. The specific forms thereof and encodings therefor in Appendix A are exemplary and other specific embodiments of such commands may be devised by those in the art to perform substantially the same function.

A first such command, designated herein as a DSBUFF (buffer select) command, effectively specifies which of the buffers 25 and 26 (frame or depth) is to be used for reading and writing.

The DS3MOD (three-dimensional drawing mode) command specifies how three-dimensional drawings should be done, and, in effect, places the processor in a three-dimensional drawing mode for performing the processes, for example, set forth in the flow charts of FIGS. 5-7.

The DSPATT command specifies the pattern to be used when displaying the image having a translucent effect at selected portions thereof (e.g. an $8 \times 8$ pattern).

The DS3PNT command specifies a single point to be written into the buffer for use in drawing a point as set forth, for example, in the flow chart of FIG. 6.

The DS3SEG command specifies depth and a constant color index value to be written into the buffers for a single horizontal segment (e.g. a horizontal segment of a triangle) which is to have a constant shading.

The DSSSEG command specifies values for a horizontal segment having a smooth (linearly interpolated) shading.

The DS3POL command specifies values for a polygon having constant surface shading.

The DSSPOL command specifies values for a polygon having a smooth (linearly interpolated) shading along its sides and along its horizontal segments, as discussed above.

The DS3VEC command specifies values for a vextor (i.e. a line along any selected direction) having a constant shading.

The DSSVEC command specifies values for a vector having a smooth (linearly interpolated) shading.

The above commands can be supplied from the host processor to the display processor using any appropriate interface mechanism which permits commands specified at the most to be placed into the form required for transfer to and use by the display processor.

While the embodiment discussed above represents a particular preferred embodiment of the invention, variations thereof will occur to those in the art within the spirit and scope of the invention. Hence, the invention is not to be limited to the particular embodiment described except as defined by the appended claims.

APPENDIX A

| | | |
|---|---|---|
| DSBUFF | Select Display Buffer | |
| FORMAT | fc | |
| | slct | |
| INPUT | fc | — 56 (Function Code). |
| | slct | — Word containing bit settings. |
| OUTPUT | None. | |
| DESCRIPTION | This function specifies which of the display buffers (banks) will be used for reading and writing, which will be used for the depth buffer, and which for viewing (on a monitor). There is also a bit for writing into all buffers (for clearing both buffers simultaneously, for example), and one for waiting until vertical retrace before updating buffer selections (for smooth double buffering of images). These buffer selections are in effect for all 3400 commands, including the basic IDOS/EGOS commands. The depth buffer is only used in the SOLIDVIEW firmware, however. These selections are made by setting bits in the slct argument as shown below: | |

Bit #: | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| | x | x | x | x | x | x | x | x | | | | | | | | |

| | | |
|---|---|---|
| Name: | Reserved | W  A  R/W  DEP  VIEW |
| where: | | |
| VIEW | — Selects the viewing buffer. | |
| DEP | — Selects the depth buffer. | |
| R/W | — Selects the read/write buffer. | |
| A | — When set, selects writing to all buffers (reading is still done from the R/W buffer). | |
| W | — When set, causes the system to wait until the start of vertical retrace before changing buffer selections. | |
| | Default settings for R/W, VIEW, W, and A are zero, and one for DEP. | |
| DS3MOD | Set 3D Drawing Mode | |
| FORMAT | fc | |
| | cmnd | |
| | bts | |

APPENDIX A-continued

|  |  |  |
|---|---|---|
| | msk | |
| | lmt | |
| | brk | |
| | xoff | |
| | yoff | |
| INPUT | fc | — 57 (function code). |
| | cmd | — Command word containing bit settings. |
| | bts | — Word specifying the number of normal vector bits. |
| | msk | — Plane enable mask (max. 12 bits). |
| | lmt | — Maximum allowable z value. |
| | brk | — First line of the second half of a split-depth buffer. |
| | xoff | — R/W buffer offset from the depth buffer when an |
| | yoff | offset or split buffer is specified. |
| OUTPUT | None. | |
| DESCRIPTION | This function specifies how three-dimensional drawing should be done. It affects only the 3D draw commands: DS3PNT, DS3SEG, DSSEG, DS3POL, DSSPOL, DS3VEC, and DSSVEC. | |

Argument cmd is a command word containing several bit settings as shown below:

Bit #: 15 14 13 12 11 10 9 8 7 6 5 4 3 2 1 0

Name: Reserved    D  P  Y  T  S  C  E  Z  N  MAP where:
- D = Disable all references to the depth buffer.
- P = (Phantom write) disable only the writes (not reads or tests) to the depth buffer.
- Y = Move origin to lower left corner.
- T = (Translucency) enable write with pattern.
- S = Enable z-clipping (sectioning).
- C = Write only on equal z-values (contouring).
- E = Enable write on greater-than-or-equal z-values (rather than just greater than).
- Z = Complement incoming z-values.
- N = Enable normal vector interpolation.
- MAP = Depth buffer mapping:
  - 00 = No offset double buffer.
  - 01 = R/W buffer x,y offset.
  - 10 = x,y offset in double buffer.

Argument bts is a word specifying the number of bits for the first and second components of the normal vector:

Bit #: 15 14 13 12 11 10 9 8 7 6 5 4 3 2 1 0

Name: Reserved              first            second
                          component        component The msk argument is a plane enable mask for depth buffer reads and writes, up to a maximum of 12 bits.
The lmt argument specifies the maximum allowable z value when z clipping is enabled.
The brk argument specifies the first line of the second half of a split depth buffer. The lines above this have their x and y coordinates swapped and are offset by the xoff value when referencing the depth buffer. The lines at brk and below are offset by the yoff value. This word is ignored unless split depth buffer mapping is enabled.
Arguments xoff and yoff specify the offset of the depth buffer from the R/W buffer when an offset or split buffer is specified. Otherwise they are ignored.
The defaults for all arguments are zeroes, except for the 12-bit msk argument, which is all ones.

| | | |
|---|---|---|
| DSPATT | Load Pattern | |
| FORMAT | fc | |
| | dat1 | |
| | dat2 | |
| | dat3 | |
| | dat4 | |
| INPUT | fc | — 58 (function code) |
| | dat1 | — Four words containing pattern. |
| | . | |
| | . | |
| | dat4 | |
| OUTPUT | None. | |
| DESCRIPTION | This function specifies an 8 by 8 pattern to be used when displaying polygons and segments when DS3MOD enables pattern mode. The pattern is aligned to screen boundaries and is initially undefined. The pattern is contained in arguments dat1 through dat4, where the high order byte of dat1 is the top row of the pattern, and | |

APPENDIX A-continued the low order byte of dat4 is the bottom row.

DS3PNT — Draw 3D Point

FORMAT
fc
x
y
z
shd

INPUT
fc — 59 (function code).
x — x-coordinate of point.
y — y-coordinate of point.
z — Depth value.
shd — Shade value to write into the read/write buffer.

OUTPUT None.

DESCRIPTION This function specifies a single point to be conditionally written into the buffers. This is particularly useful if the host decomposes surfaces directly into pixels.

DS3SEG — Draw 3D Constant-Shaded Horizontal Segment

FORMAT
fc
x1
y
z1
shd
x2
z2

INPUT
fc — 60 (function code).
x1 — x-coordinate of first endpoint.
y — y-coordinate of both endpoints.
z1 — Depth of first endpoint.
shd — Shade value of the segment.
x2 — x-coordinate of second endpoint.
z2 — Depth of second endpoint.

OUTPUT None.

DESCRIPTION This function specifies a single horizontal scan segment of constant shade to be conditionally written to the buffers.
The z values for the endpoints are specified by arguments z1 and z2, while those for pixels along the line are determined by interpolation between z1 and z2.

DSSSEG — Draw 3D Smooth-Shaded Horizontal Segment

FORMAT
fc
x1
y
z1
shd1
x2
z2
shd2

INPUT
fc — 61 (function code).
x1 — x-coordinate of first endpoint.
y — y-coordinate of both endpoints.
z1 — Depth of first endpoint.
shd1 — Shade value of first endpoint.
x2 — x-coordinate of second endpoint.
z2 — Depth of second endpoint.
shd2 — Shade value of second endpoint.

OUTPUT None.

DESCRIPTION This function conditionally writes a single horizontal scan line of variable shading to the buffers. As with DS3SEG, z-values for pixels along the line are interpolated between z1 and z2. Likewise, shade values along the line are interpolated between shd1 and shd2. Format of the shd1 and shd2 arguments are determined by the DS3MOD command.

DS3POL — Draw 3D Constant-Shade Polygon

FORMAT
fc
shd
cnt
x1
y1
z1
.
.
.
xn
yn
zn

INPUT
fc — 62 (function code).
shd — Shade value to write to the R/W buffer.
cnt — Number of polygon vertices.
x1-xn — x-coordinates of polygon vertices.

APPENDIX A-continued

|  |  |  |
|---|---|---|
|  | y1-yn | — y-coordinates of polygon vertices. |
|  | z1-zn | — Depth of polygon vertices. |
| OUTPUT | None. | |
| DESCRIPTION | This function conditionally draws a polygon of constant shade. The coordinates and depths of the polygon vertices are specified with xyz arguments, and the z-values of the pixels within the polygon are calculated by interpolating the z values at the vertices. The number of vertices is specified with argument cnt, which must be greater than 2. | |
| DSSPOL | Draw 3D Smooth-Shaded Polygon | |
| FORMAT | fc | |
|  | cnt | |
|  | x1 | |
|  | y1 | |
|  | z1 | |
|  | shd1 | |
|  | . | |
|  | . | |
|  | . | |
|  | xn | |
|  | yn | |
|  | zn | |
|  | shdn | |
| INPUT | fc | — 63 (function code). |
|  | cnt | — Number of polygon vertices. |
|  | x1-xn | — x-coordinates of polygon vertices. |
|  | y1-yn | — y-coordinates of polygon vertices. |
|  | z1-zn | — Depths of polygon vertices. |
|  | shd1-shd2 | — Shade values of polygon vertices. |
| OUTPUT | None. | |
| DESCRIPTION | This function conditionally draws a polygon with a smoothly varying shade. The coordinates of the vertices are specified with xyz coordinate triplets, and the shading of each vertex is specified by arguments shd1-shdn. The depths and shade values of pixels within the polygon are calculated by interpolating the depth and shade values at the vertices. The number of vertices is specified by argument cnt, which must be greater than 2.<br>Format of the shd arguments is determined by the DS3MOD command. | |
| DS3VEC | Draw 3D Constant-Shade Vector | |
| FORMAT | fc | |
|  | x1 | |
|  | y1 | |
|  | z1 | |
|  | shd | |
|  | x2 | |
|  | y2 | |
|  | z2 | |
| INPUT | fc | — 64 (function code). |
|  | x1,y1 | — Coordinates of first endpoint. |
|  | z1 | — Depth of first endpoint. |
|  | shd | — Shade value of the vector. |
|  | x2,y2 | — Coordinates of second endpoint. |
|  | z2 | — Depth of second endpoint. |
| OUTPUT | None. | |
| DESCRIPTION | This function conditionally draws a vector of a constant shade. The coordinates and depths of the endpoints are specified with xyz triplets, and the shade is specified with argument shd. The depth of the pixels comprising the vector are calculated by interpolating the z-values at the endpoints. | |
| DSSVEC | Draw 3D Smooth-Shaded Vector | |
| FORMAT | fc | |
|  | x1 | |
|  | y1 | |
|  | z1 | |
|  | shd1 | |
|  | x2 | |
|  | y2 | |
|  | z2 | |
|  | shd2 | |
| INPUT | fc | — 65 (function code). |
|  | x1,y1 | — Coordinate of first endpoint. |
|  | z1 | — Depth of first endpoint. |
|  | shd1 | — Shade of first endpoint. |
|  | x2,y2 | — Coordinate of second endpoint. |
|  | z2 | — Depth of second endpoint. |
|  | shd2 | — Shade of second endpoint. |
| OUTPUT | None. | |

APPENDIX A-continued

| DESCRIPTION | This function conditionally draws a single vector with a smoothly varying shade. The coordinates and depths of the endpoints are specified by xyz argument triplets. The shade of the endpoints is specified with arguments shd1 and shd2. The depth and shading of the pixels comprising the vector are calculated by interpolating the depth and shade values at the endpoints. Format of the shd arguments is determined by the DS3MOD command. |
|---|---|

What is claimed is:

1. A system for use in displaying a three-dimensional representation of an image on a two-dimensional display means, said system comprising:
   host processor means responsive to input data from a data base source defining said image for generating host data representing one or more three-dimensional geometric elements comprising said image to be used for display on the display means;
   display processor means responsive to said host data for providing output data for use by the display means; said display processor means including
   means responsive to host data defining selected points of said geometric elements for determining the depth relationships of points required to form said displayed image and to obtain depth data for those points which are to be displayed as visible points in said image and to obtain image data defining the color and intensity corresponding to said visible points in said image;
   means for storing depth data for those points determined as visible points;
   means for storing image data corresponding to said visible points; and
   means responsive to said stored image data for supplying said stored image data as output data for use by the display means for displaying thereon the visible points required to produce a three-dimensional representation of said image.

2. A system in accordance with claim 1 wherein the means for determining said depth relationships to obtain said depth data and said image data is a microprocessor means.

3. A system in accordance with claim 2 wherein said display processor means provides current output data for use by a raster display means directly from said image storing means while further host data is being supplied from said host processor to said display processor means.

4. A system in accordance with claim 3 wherein said depth data storing means comprises a depth buffer means and said image data storing means comprises a frame buffer means.

5. A system in accordance with claim 4 wherein said frame buffer means stores color and intensity values which can be directly supplied for use by said raster display means.

6. A system in accordance with claim 4 wherein said frame buffer means stores color index values relating to said image data; and further including color look-up table means for storing color and intensity values and responsive to said color index values for supplying color and intensity values which can be supplied for use by said raster display means.

7. A system in accordance with claim 6 wherein said output data is supplied as video output data for use by a cathode ray tube video display means.

8. A system in accordance with claim 6 wherein said microprocessor means includes means for determining the depth value at a selected point corresponding to each currently processed point of said image relative to the depth value previously stored in said depth data storing means at said selected point.

9. A system in accordance with claim 8 wherein said determining means includes
   means for reading the depth value at said selected point from said depth buffer means;
   means for comparing the depth value of a currently processed point corresponding to said selected point with the depth value read from said depth buffer means at said selected point; and
   means responsive to said comparison for writing the color index values of currently processed points which are determined as visible points into said frame buffer means.

10. A system in accordance with claim 9 wherein said writing means writes the color index values of said currently processed point into said frame buffer means when the depth value thereof is greater than the depth value read from said depth buffer means indicating that the video image data at said currently processed point is to be visibly displayed.

11. A system in accordance with claim 10 wherein said microprocessor means further includes means for selecting a reference depth value which is to be used as the zero depth value reference for the three-dimensional representation of the image for use by the display means.

12. A system in accordance with claim 9 for use in displaying a two-dimensional representation of an image wherein said microprocessor means further includes means for disabling said writing means to prevent the writing of depth data into said depth buffer means in response to said comparison when the image to be displayed is to be a two-dimensional image representation.

13. A system in accordance with claim 9 wherein said microprocessor means further includes means responsive to said comparing means for permitting the display of said currently processed point at a selected point of said image when its depth value is either equal to or greater than the currently stored depth value in said depth buffer at said point.

14. A system in accordance with claim 4 wherein said host processor includes means for providing a command signal which selects either said depth data storing means or said frame buffer means for storing information provided by said microprocessor means depending on whether said information is depth data or image data.

15. A system in accordance with claim 2 wherein said microprocessor means further determines whether the three-dimensional representation of said image to be displayed is to provide an image one or more portions of which display a translucency effect.

16. A system in accord with claim 15 wherein said host processor includes means for providing a command signal which specifies said pattern of image data for use in one or more selected portons of said image which produces a translucent effect in said displayed image representation.

17. A system in accordance with claim 15 wherein
said host processor means provides data defining a pattern of image data representing a selected degree of translucency for permitting a plurality of points normally determined as non-visible to be partially visible in said displayed image; and
said display processor means further includes means responsive to said pattern data for permitting the display of a selected plurality of normally non-visible points as a display of partially visible points so as to display said translucency effect.

18. A system in accordance with claim 17 wherein said pattern is defined as comprising a selected ratio of visible to non-visible points in said selected plurality of points, said selected ratio determining the degree of translucency.

19. A system in accordance with claim 2 wherein said microprocessor means further includes means for determining whether the depth value of a currently processed data point is less than or equal to a selected limit depth value when a portion of said three-dimensional image representation is to provide an image, one or more portions of which are to be used for display in cross-section on the display means.

20. A system in accordance with claim 2 wherein said microprocessor means further includes means for controlling the display of one or more points having a common depth at a selected location of said image so that the intersection of said one or more points is to be displayed with greater intensity on the display means.

21. A system in accordance with claim 1 wherein said host processor supplies input information concerning the vertices of one or more geometric elements which form said image; and
said determining and depth data and image data providing means responds to said vertex input information to obtain depth data and image data concerning said vertices and further obtains depth data and image data concerning the remaining points defining the surfaces of said geometric elements.

22. A system in accordance with claim 21 wherein the depth and image data concerning said remaining points are obtained by linear interpolation of the values of the image data at said vertices.

23. A system in accordance with claim 22 wherein the values of said image data at points along the lines between said vertices are obtained by linearly interpolating between the values of said image data at said vertices.

24. A system in accordance with claim 23 wherein the values of the image data along horizontal segments having as end points the points along said lines between said vertices are obtained by linearly interpolating the values of said image data at said end points.

25. A system in accordance with claim 1 wherein said host processor includes means for providing a command signal which specifies that said display processor means is to be placed in an operating mode for providing said three-dimensional image representation.

26. A system in accord with claim 1 wherein said host processor includes means for providing a command signal which specifies single points with respect to which image and depth data are to be stored for use in displaying said image representation.

27. A system in accord with claim 1 wherein said host processor includes means for providing a command signal which specifies the image and depth values which are to be stored for use in producing a single horizontal segment of said image having a constant shading for use in displaying said horizontal segment in said image representation.

28. A system in accord with claim 1 wherein said host processor includes means for providing a command signal which specifies the image and depth values to be stored for use in providing a single horizontal segment of said image having a smooth linearly interpolated shading for use in displaying said horizontal segment in said image representation.

29. A system in accord with claim 1 wherein said host processor includes means for providing a command signal which specifies the image and depth values to be stored for use in producing a polygon of said image having a constant shading over the surface of said polygon for use in displaying said polygon in said image representation.

30. A system in accord with claim 1 wherein said host processor includes means for providing a command signal which specifies the image and depth value to be stored for use in producing a polygon of said image having a smooth linearly interpolated shading over said surface for use in displaying said polygon in said image representation.

31. A system in accord with claim 1 wherein said host processor includes means for providing a command signal which specifies the image and depth values which are to be stored for use in producing a single vector of said image having a constant shading for use in displaying said vector in said image representation.

32. A system in accord with claim 1 wherein said host processor includes means for providing a command signal which specifies the image and depth values to be stored for use in providing a single vector of said image having a smooth linearly interpolated shading for use in displaying said vector in said image representation.

33. A system in accordance with claim 1 wherein said means for supplying said stored image data is capable of supplying said stored image data substantially immediately as output data for use by the display means.

34. A system for displaying a three-dimensional representation of an image on a two-dimensional display means, said system comprising:
host processor means responsive to input data from a data base source defining said image for generating host data representing the configuration and orientation of one or more three-dimensional geometric elements comprising said image to be displayed on said display means;
display processor means responsive to said host data for providing output data to said display means, said display processor means including
processing means responsive to said host data representing said geometric elements for obtaining depth data at each point required for the display of said one or more elements of said image and for obtaining image data defining the color and intensity corresponding to said each point;
means for storing depth data;
means for storing image data;
said processing means further comparing the depth data obtained at said each point to determine which image data at said each point is to be displayed as visible image data and storing in said depth data storing means the depth data for those points of said elements which are so determined as visible points;
said processing means further storing in said image data storing means the image data corresponding to the depth data at each said visible point; and
means responsive to said stored image data for supplying said stored image data as output data to said display means for displaying thereon the visible points required to produce a three-dimensional representation of said image.

35. A system in accordance with claim 34 wherin said means for supplying said stored image data is capable of supplying said stored image data substantially immediately as output data for use by the display means.

36. A system for displaying a three-dimensional representation of an image on a two-dimensional display means, said system comprising
host processor means responsive to input data from a data base source defining said image for generating host data representing one or more geometric elements comprising said image to be used for display on a display means;
display processor means responsive to said host data for providing output data for use in a display means, said display processor means including
processing means continually responsive to host data containing the position, depth, and image information of selected points of said geometric elements;
depth buffer means for storing image information at locations corresponding to said position information;
said processing means continually comparing depth information currently being supplied from said host processor means at each point of said image with depth information previously stored in said depth buffer means at said each point to determine which image information corresponding to said each point is to be displayed as visible image information, said processing means storing in said depth buffer the depth information for each said visible point of said image and for storing in said image buffer means the image information corresponding to each said visible point,
means responsive to the image information stored in said image buffer means for continually supplying said stored image information as output data for substantially immediate use in a display means as said host data is being supplied to said display processor means so that said image is incrementally displayed on the display means as said host data is being processed by said display processor means.

* * * * *

UNITED STATES PATENT AND TRADEMARK OFFICE
CERTIFICATE OF CORRECTION

PATENT NO. : 4,475,104
DATED : October 2, 1984
INVENTOR(S) : Tsu Y. Shen

It is certified that error appears in the above-identified patent and that said Letters Patent is hereby corrected as shown below:

Column 24, cancel lines 9-11 and insert the following;
--depth buffer means for storing depth information at locations corresponding to said position information;--.

Signed and Sealed this

Thirtieth Day of July 1985

[SEAL]

Attest:

DONALD J. QUIGG

Attesting Officer    Acting Commissioner of Patents and Trademarks

UNITED STATES PATENT AND TRADEMARK OFFICE
CERTIFICATE OF CORRECTION

PATENT NO. : 4,475,104
DATED      : October 2, 1984
INVENTOR(S) : Tsu Y. Shen

It is certified that error appears in the above-identified patent and that said Letters Patent is hereby corrected as shown below:

Column 24, claim 36, after line 8, insert the following new paragraph:

--depth buffer means for storing depth
    information at locations corresponding
    to said position information;--

Column 24, claim 36, line 9, "depth" should read --image--.

This certificate supersedes certificate of correction issued July 30, 1985.

Signed and Sealed this

Seventeenth Day of December 1985

[SEAL]

Attest:

DONALD J. QUIGG

Attesting Officer

Commissioner of Patents and Trademarks